United States Patent
Götz

(10) Patent No.: US 7,108,283 B2
(45) Date of Patent: Sep. 19, 2006

(54) INDUSTRIAL TRUCK WITH A REAR WEIGHT AND AN INTERNAL COMBUSTION ENGINE

(75) Inventor: Bernhard Götz, Aschaffenburg (DE)

(73) Assignee: Linde Aktiengesellschaft, (DE)

( * ) Notice: Subject to any disclaimer, the term of this patent is extended or adjusted under 35 U.S.C. 154(b) by 0 days.

(21) Appl. No.: 11/237,273

(22) Filed: Sep. 27, 2005

(65) Prior Publication Data

US 2006/0021816 A1 Feb. 2, 2006

Related U.S. Application Data

(63) Continuation of application No. 09/421,676, filed on Oct. 20, 1999, now abandoned.

(30) Foreign Application Priority Data

Oct. 28, 1998 (DE) ................. 198 49 753

(51) Int. Cl.
    B66C 23/06 (2006.01)
(52) U.S. Cl. ............... 280/759; 180/312; 180/299
(58) Field of Classification Search ............... 280/757, 280/759; 180/291, 297, 299, 300; 248/638
    See application file for complete search history.

(56) References Cited

U.S. PATENT DOCUMENTS

| | | | |
|---|---|---|---|
| 1,698,453 A | 1/1929 | Sardeson et al. | |
| 3,504,933 A | 4/1970 | Avis et al. | |
| 3,540,540 A * | 11/1970 | Schwab | 180/68.4 |
| 3,559,385 A * | 2/1971 | Eaton | 56/10.7 |
| 3,645,349 A | 2/1972 | Nichter | |
| 3,721,318 A | 3/1973 | Warrender | |
| 3,851,712 A | 12/1974 | Purcell | |
| 3,851,776 A | 12/1974 | Leyrat | |
| 4,029,340 A | 6/1977 | Chelin | |
| 4,159,126 A | 6/1979 | Raleigh | |
| 4,173,264 A | 11/1979 | Erker et al. | |
| 4,189,020 A * | 2/1980 | Abels et al. | 180/68.1 |
| 4,202,453 A | 5/1980 | Wilkes, Jr. et al. | |
| 4,253,535 A | 3/1981 | Kleine et al. | |
| 4,502,709 A | 3/1985 | Schaeff | |
| 4,538,697 A | 9/1985 | Muroi et al. | |
| 4,580,811 A | 4/1986 | Wykhuis et al. | |
| 4,647,088 A | 3/1987 | Nelson | |
| 4,692,085 A | 9/1987 | Parsons | |
| 4,754,791 A | 7/1988 | Flebbe | |
| 4,859,133 A * | 8/1989 | Maria | 414/462 |
| 5,152,658 A | 10/1992 | Martin | |
| 5,269,554 A | 12/1993 | Law et al. | |
| 5,447,211 A | 9/1995 | Sors | |
| 5,551,519 A | 9/1996 | Pach | |
| 5,733,092 A | 3/1998 | Barry | |
| 6,062,160 A | 5/2000 | Delcambre | |
| 6,085,858 A | 7/2000 | Wakana et al. | |
| 6,138,783 A | 10/2000 | Chene et al. | |
| 6,155,373 A * | 12/2000 | Kajino | 180/299 |
| 6,454,034 B1 | 9/2002 | Gotz | |
| 6,533,319 B1 * | 3/2003 | Denby et al. | 280/759 |
| 2003/0056404 A1 * | 3/2003 | Iwasa et al. | 37/347 |
| 2004/0190995 A1 * | 9/2004 | Matsushita et al. | 405/174 |

* cited by examiner

*Primary Examiner*—Kevin Hurley
(74) *Attorney, Agent, or Firm*—The Webb Law Firm

(57) ABSTRACT

An industrial truck, in particular a fork lift truck, is provided with a rear weight and an internal combustion engine. The internal combustion engine is fastened to the rear weight. The internal combustion engine is advantageously mounted so that it can oscillate around an axis that extends in the transverse direction of the industrial truck.

20 Claims, 1 Drawing Sheet

INDUSTRIAL TRUCK WITH A REAR WEIGHT AND AN INTERNAL COMBUSTION ENGINE

CROSS REFERENCE TO RELATED APPLICATION

This application is a continuation of U.S. patent application Ser. No. 09/421,676 filed Oct. 20, 1999, now abandoned which is herein incorporated by reference in its entirety.

BACKGROUND OF THE INVENTION

1. Field of the Invention

This invention relates generally to an industrial truck and, more particularly, to a fork lift truck having a rear weight and an internal combustion engine.

2. Description of the Currently Available Technology

During the operation of an industrial truck, the internal combustion engine located in the truck generates vibrations that are frequently transmitted via the vehicle frame into other areas of the industrial truck which include, for example, the vicinity of the driver's cab. Consequently, structural noises and vibrations are generated that are frequently experienced as a significant annoyance by the person in the driver's cab. The rear weight or "counterweight", which is usually connected to the vehicle frame of the industrial truck, represents a component that is independent of the internal combustion engine in known industrial trucks.

On industrial trucks of the prior art it is customary to fasten the internal combustion engine to the vehicle frame and to use damping elements to minimize the transmission of vibrations from the engine to the frame. Such a mounting of the internal combustion engine is relatively complex and expensive. Further, with this location of the internal combustion engine, it is not possible to completely isolate the various components of the industrial truck from the vibrations of the internal combustion engine.

Therefore, it is an object of the invention to provide an industrial truck on which it is possible to use an easily manufactured mounting of the internal combustion engine to prevent the transmission of vibrations into additional components of the industrial truck, in particular into the vicinity of the driver's cab.

SUMMARY OF THE INVENTION

The invention teaches that the above object can be accomplished by fastening the internal combustion engine to the rear weight. On account of its large mass, the rear weight can be excited to vibrate only to a very small extent by the internal combustion engine. Thus, vibrations and structural noises are not transmitted to other components that are also connected with the rear weight. This vibration-damping effect of the rear weight is reinforced by the high internal damping of the gray cast iron conventionally used for the rear weight. In addition, it is possible to pre-assemble the internal combustion engine on the rear weight, as a result of which the rear weight and the internal combustion engine can be connected in the form of a single assembly to the vehicle frame of the industrial truck.

It is particularly advantageous if the internal combustion engine is oriented in a transverse direction of the industrial truck. It is thereby possible to utilize the entire width of the industrial truck. A portion of the driver's cab of the industrial truck, for example, can therefore be located in the longitudinal space that becomes available as a result of this transverse orientation of the engine in industrial truck.

Preferably, at least one fastening means for the internal combustion engine is located on the rear weight, whereby the internal combustion engine is mounted on the fastening means so that it can oscillate. The fastening means can be connected to the rear weight by threaded fasteners. The internal combustion engine is preferably mounted on the fastening means so that it can oscillate, i.e., it has a rotational degree of freedom. In this case it is appropriate if the internal combustion engine is mounted so that it can oscillate around an axis that extends in the transverse direction of the industrial truck. The axis is thus substantially parallel to a crankshaft of the internal combustion engine. It is also advantageous if the fastening means have an elastic damping element. The damping element reduces the vibrations that are transmitted to the rear weight. The damping elements can also be used to compensate for manufacturing tolerances of the fastening elements.

To connect the internal combustion engine with the rear weight, there is also preferably a torque support that is located at some distance from the axis. The oscillating movement of the internal combustion engine made possible by the fastening elements is limited by the torque support. The torque support also contains elastic elements, so that an oscillating movement of the internal combustion engine relative to the rear weight becomes possible.

There are additional advantages if a hydraulic unit is fastened to the internal combustion engine. The hydraulic unit, preferably a hydraulic pump, can be pre-assembled together with the internal combustion engine on the rear weight. The hydraulic unit does not require its own damping elements.

BRIEF DESCRIPTION OF THE DRAWINGS

Additional advantages and details of the invention are explained in greater detail below with reference to the exemplary embodiment illustrated in the accompanying schematic figures, in which like reference numbers indicate like parts throughout.

DESCRIPTION OF THE PREFERRED EMBODIMENTS

Figure 1:
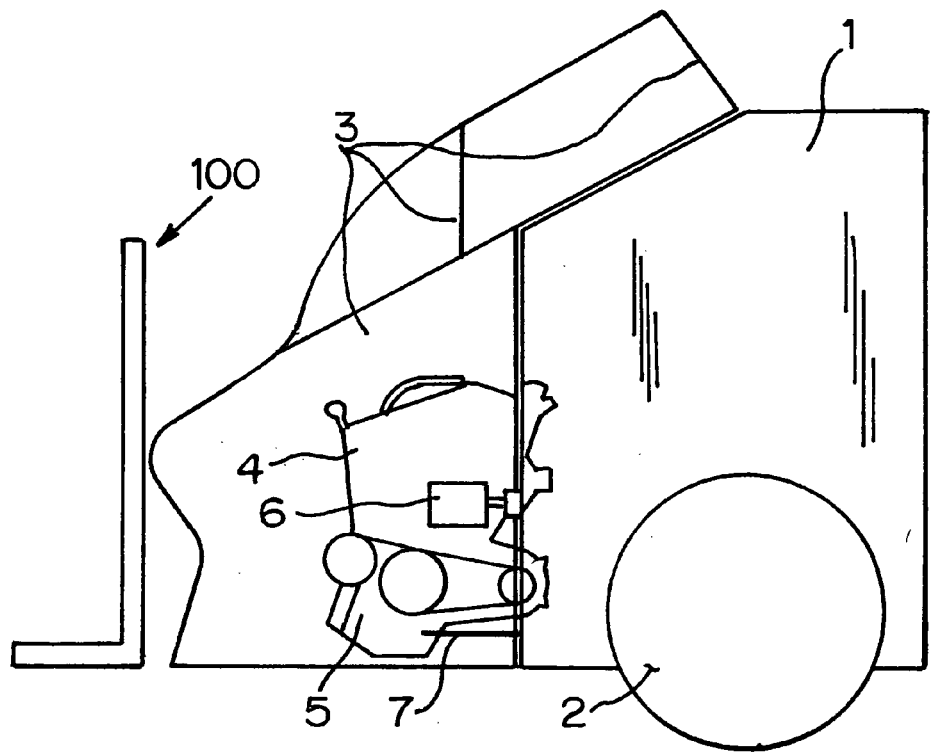
FIG. 1 is a side view of a rear portion of an industrial truck incorporating features of the invention.

FIG. 1 shows the rear portion of an industrial truck that is configured as a fork lift truck. FIG. 1 shows a rear weight 1 as well as a steerable rear wheel 2 of the fork lift truck, which rear wheel 2 is fastened to the rear weight 1. FIG. 1 also shows a portion of a vehicle frame 3 of the fork lift truck that is bolted to the rear weight 1. A driver's cab of the fork lift is formed from a portion of the vehicle frame 3. A conventional lifting mechanism 100 is located on the front of the fork lift truck.

Figure 2:
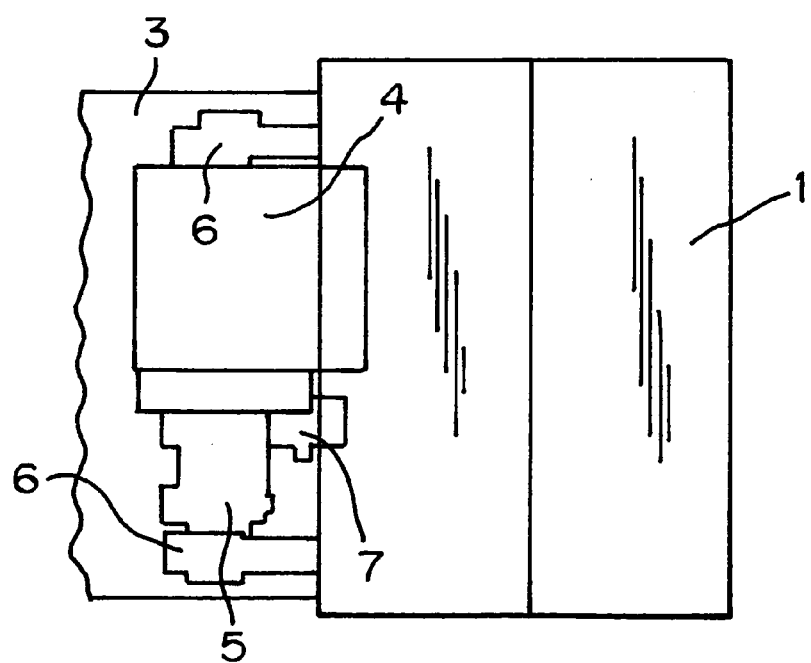
FIG. 2 is a plan view of the rear portion of an industrial truck incorporating features of the invention.

As will be appreciated by one skilled in the art, the terms "rear weight" or "counterweight" refer to a component that is separate from the frame itself. That is, these terms do not refer merely to the weight of the rear part of the vehicle frame. A conventional rear weight 1, as is shown in FIGS. 1 and 2, can take the form of a block of material having a high internal damping, such as gray cast iron. This block of material is attached to the vehicle frame at or near the rear of the vehicle. Thus, the "rear weight" or "counterweight"

refers to a component that is different from, i.e., separate from, the other vehicle components, e.g., vehicle frame, engine, etc. Examples of conventional rear weights are disclosed in U.S. Pat. Nos. 4,580,811; 3,851,776; 4,029,340; and 4,173,264.

An internal combustion engine 4 is oriented crosswise in the fork lift truck. A hydraulic unit 5 that comprises one or more hydraulic pumps is rigidly connected with the internal combustion engine 4, and forms an assembly with the latter. The internal combustion engine 4 is carried on or fastened to the rear weight 1 by fastening means 6. The fastening means 6 may be formed by two pendulum bearings that permit an oscillating movement of the internal combustion engine 4 around an axis oriented substantially in the transverse direction of the fork lift truck. The fastening means 6 are equipped with elastic damping elements that at least partly absorb the vibrations generated by the internal combustion engine 4 and the hydraulic unit 5.

The oscillating movement of the internal combustion engine 4 is restricted by a torque support 7 which is also located between the internal combustion engine 4 and the rear weight 1. The torque support 7 is preferably also equipped with elastic damping elements. FIG. 2 shows an overhead view of the portion of the fork lift truck illustrated in FIG. 1. FIG. 2 shows in particular the location of the two pendulum bearings that form the fastening means 6. The pendulum bearing shown at the top of the drawing is connected directly to a housing of the internal combustion engine 4, while the lower pendulum bearing in the drawing is fastened to the hydraulic unit 5, which for its part is rigidly connected with the internal combustion engine 4.

The internal combustion engine 4 and the hydraulic unit 5 can be pre-assembled jointly on the rear weight 1. The rear weight 1, the internal combustion engine 4 and the hydraulic unit 5 thus form a single assembly, as a result of which they can be easily, quickly and economically installed simultaneously on the vehicle frame 3.

It will readily be appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

What is claimed is:

1. An industrial truck, comprising:
   a frame having a front end and a rear end;
   a lifting mechanism located at the front end of the frame;
   a rear weight located at the rear end of the frame, the rear weight being separate from the frame and carried on the frame and made out of high internal damping material; and
   an internal combustion engine, wherein the internal combustion engine is mounted on the rear weight such that the weight of the engine and the rear weight is carried on the frame and such that the rear weight is positioned between the engine and the frame such that vibrations from the engine are transmitted from the engine to the rear weight and from the rear weight to the frame.

2. The industrial truck as claimed in claim 1, wherein the internal combustion engine is oriented in a substantially transverse direction of the industrial truck.

3. The industrial truck as claimed in claim 1, including at least one fastening means for the internal combustion engine located on the rear weight, wherein the internal combustion engine is mounted on the fastening means such that the engine can oscillate and such that engine vibrations are transmitted directly to the rear weight.

4. The industrial truck as claimed in claim 1, wherein the internal combustion engine is mounted such that the engine can oscillate around an axis that extends in a substantially transverse direction of the industrial truck.

5. The industrial truck as claimed in claim 3, wherein the fastening means include an elastic damping element.

6. The industrial truck as claimed in claim 4, including a torque support that connects the internal combustion engine with the rear weight, the torque support located at a distance from the axis.

7. The industrial truck as claimed in claim 1, including a hydraulic unit fastened to the internal combustion engine such that the hydraulic unit and internal combustion engine are mounted directly on the rear weight.

8. The industrial truck as claimed in claim 2, including at least one fastening means for the internal combustion engine connected directly to the rear weight, wherein the internal combustion engine is mounted on the fastening means such that the engine can oscillate.

9. The industrial truck as claimed in claim 2, wherein the internal combustion engine is mounted such that the engine can oscillate around an axis that extends in a substantially transverse direction of the industrial truck.

10. The industrial truck as claimed in claim 3, wherein the internal combustion engine is mounted such that the engine can oscillate around an axis that extends in a substantially transverse direction of the industrial truck.

11. The industrial truck as claimed in claim 4, wherein the fastening means include an elastic damping element.

12. The industrial truck as claimed in claim 9, including a torque support extending between and connected to both the internal combustion engine and the rear weight, the torque support located at a distance from the axis.

13. The industrial truck as claimed in claim 10, including a torque support that connects the internal combustion engine with the rear weight, the torque support located at a distance from the axis.

14. The industrial truck as claimed in claim 11, including a torque support that connects the internal combustion engine with the rear weight, the torque support located at a distance from the axis.

15. The industrial truck as claimed in claim 2, including a hydraulic unit fastened to the internal combustion engine.

16. The industrial truck as claimed in claim 3, including a hydraulic unit fastened to the internal combustion engine.

17. The industrial truck as claimed in claim 4, including a hydraulic unit fastened to the internal combustion engine.

18. The industrial truck as claimed in claim 5, including a hydraulic unit fastened to the internal combustion engine.

19. The industrial truck as claimed in claim 1, wherein the rear weight comprises a block of cast iron.

20. An industrial truck, comprising:
    a frame having a front end and a rear end;
    a counterweight attached to the rear end of the frame, the counterweight comprising a block of cast iron; and
    an internal combustion engine,
    wherein the internal combustion engine is mounted on the cast iron counterweight block, and wherein the counterweight block is positioned between the engine and the frame such that vibrations from the engine are transmitted directly into the counterweight block.

* * * * *

UNITED STATES PATENT AND TRADEMARK OFFICE
CERTIFICATE OF CORRECTION

| | | |
|---|---|---|
| PATENT NO. | : 7,108,283 B2 | Page 1 of 1 |
| APPLICATION NO. | : 11/237273 | |
| DATED | : September 19, 2006 | |
| INVENTOR(S) | : Götz | |

It is certified that error appears in the above-identified patent and that said Letters Patent is hereby corrected as shown below:

Column 3, Lines 65-66, Claim 3, "including least one" should read -- including at least one --

Signed and Sealed this

Thirteenth Day of February, 2007

JON W. DUDAS
*Director of the United States Patent and Trademark Office*